May 27, 1924.
A. W. THAW
DEVICE FOR TESTING ELECTRIC CIRCUITS
Filed June 25, 1923
1,495,619
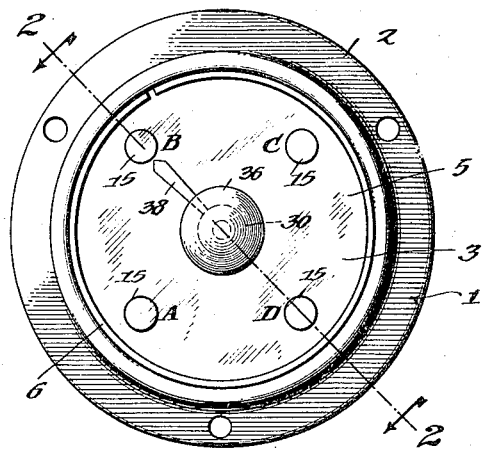
Fig.1
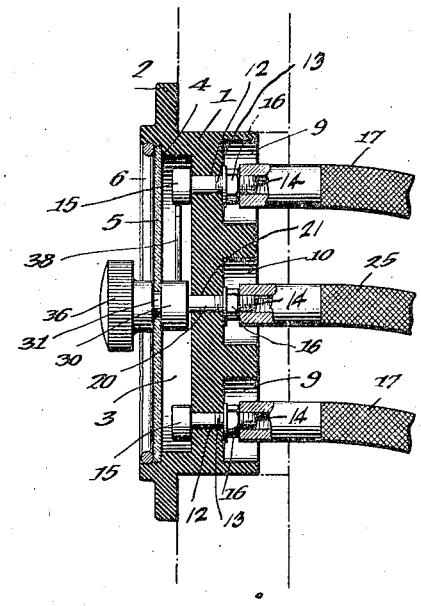
Fig.2
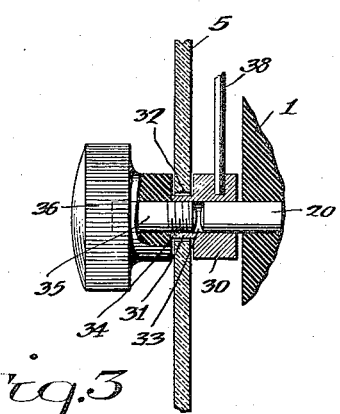
Fig.3
Fig.4
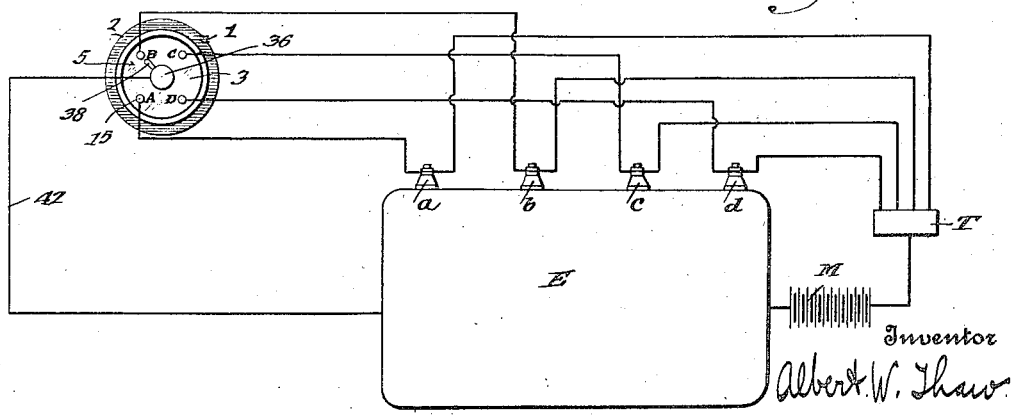
Inventor
Albert W. Thaw
By Wood & Wood
Attorneys Patented May 27, 1924.

1,495,619

UNITED STATES PATENT OFFICE.

ALBERT W. THAW, OF NORWOOD, OHIO.

DEVICE FOR TESTING ELECTRIC CIRCUITS.

Application filed June 25, 1923. Serial No. 647,417.

*To all whom it may concern:*

Be it known that I, ALBERT W. THAW, a citizen of the United States, and residing at Norwood, in the county of Hamilton and State of Ohio, have invented a new and useful Improvement in Devices for Testing Electric Circuits, of which the following specification is a full disclosure.

This invention relates generally to improvements in devices for testing electric circuits, and is particularly directed to a testing device as a unit adapted to be used in conjunction with the ignition circuit of an automobile engine, although the device may be used for testing other circuits.

An object of the invention is to provide a device of simple construction and compact design, the parts of which may be conveniently and quickly assembled in operating position, and repaired or replaced at small expense.

Another object is to provide a sectional testing knob, the parts of which are detachably secured to the cover of the device, which cover in turn is removably secured within the base, providing for convenient removal of the cover and knob.

Other objects and certain advantages will appear in the description of the drawings forming a part of this specification, in which drawings:

Figure 1 is a face view;

Figure 2 is a section on line 2—2 of Figure 1;

Figure 3 is an enlarged detail view of the sectional testing knob and mounting therefor; and Figure 4 is a diagram showing the device connected in an automobile ignition circuit.

The device comprises a one-piece substantially cylindrical base 1 of insulating material, having adjacent one face a circumferential flange 2 forming a shoulder for limiting insertion of the base within an opening provided in the support to which the device is attached.

The base has in its front face a circular depression 3 as a sparking chamber, having a circumferential shoulder 4 against which is removably engaged a transparent cover plate 5, preferably of glass, detachably held in position by a springing element 6, said plate acting as an auxiliary support for a rotatable sectional testing knob, within which support said knob is locked against outward displacement. The cover plate 5 may, however, be of any material, or may have the form of a spider to adapt the same as a supporting element. The base is further provided in its rear face with a series of equally spaced circularly arranged depressions 9, said depressions acting as binding post housings, the same being concentrically arranged relative to a similar central depression 10. The pockets or depressions 9 have bores 12 extending centrally therefrom through the base and opening into the depression 2, and in said openings are inserted metallic binding posts 13 as terminal conductor elements, or stationary electrodes. The said binding posts are threaded as at 14, and each has a cylindrical head 15 lying within the depression 3. The posts are clamped by nuts 16 engaging the threads 14. In threaded connection with the threads 14 of the posts are suitable conductors 17 as elements of the electric circuit in which my detector is used.

The central conductor element 20, as a combined pivot and binding post, is non-rotatively disposed within a central bore 21 and extends into the depression 3 to form a pivot. With that end of the element 20 lying within the depression 10 is connected a ground or return conductor 25.

Within the depression or sparking chamber 3 and upon the element 20, is frictionally rotatively mounted a cylindrical conducting member 30 as one element of a sectional two-part operating or testing knob, said member 30 having a central bore 33 and being counterturned to provide a central tubular extension 31 freely rotative within a central opening 32 of the cover 5, said extension being of greater length than the thickness of said cover and being projected slightly beyond the outer face of said cover. The outer end of the bore 33 of the element 30 is threaded as at 34, and engaged with said threads are corresponding threads of shank 35, embedded in a cylindrical knurled non-conducting member 36 as a thumb or finger piece. The inner face of said finger piece is engaged with the outer face of the tubular extension 31, thus spacing the parts of the operating knob and forming a groove, permitting free rotative movement of the knob within the opening of the cover and locking said knob against endwise displacement. Projecting radially from the element 30 is a metallic finger 38 as a rotatable electrode adapted to be brought into opposition to each head 15 as the knob is turned, said finger being of such length that it will not engage the heads, but when in opposition to any one of the same, as shown in Fig. 1, will be spaced therefrom to form a gap, across which gap a spark may or may not appear when a test is being made.

In case of breakage of the covering glass, the sections of the testing knob may be separated and the same quickly reassembled upon a new cover, which cover can be quickly and conveniently replaced in the base 1.

My improved trouble detector or testing device is herein shown, in Fig. 4, as an element in the electric circuit of an automobile ignition system, but may be used in other electric circuits. The engine is indicated at 40, and the spark plugs at $a$, $b$, $c$, $d$, one terminal of each plug being connected by a conductor with corresponding binding posts respectively indicated by letters A, B, C, D, the opposite terminal of each plug being grounded upon the engine. Each binding post has a conductor connected with a corresponding terminal of the timer T, and the timer brush is connected by a suitable conductor with one terminal of a battery, or other source of electric power, M. The opposite terminal of the battery is grounded upon the engine as shown, and the central post 20 is grounded upon the engine by conductor 42.

The manipulation of the device is simple. When irregularities in the operation of the engine develop, the source of trouble can be detected by rotating the knob to successively bring the finger in opposition to each head 15. During this operation, if a weak spark or no spark, appears, the indication is that that particular spark plug of the engine is not properly functioning. By noting the character of the sparks, the presence and cause of other irregularities may be ascertained.

Having described my invention, I claim:

1. In a device of the class described, a base member of insulating material having a relatively large depression in one face, and having a plurality of relatively small sockets in the opposite face, said sockets circularly arranged about a central socket, conducting elements extending through said base from each socket and projecting into said depression, a cover for said depression having a central opening therein, and a sectional knob comprising a conducting member frictionally pivoted upon said central conducting element, said conducting member having a reduced extension of greater length than the thickness of said cover, engaged within the central opening of said cover, said conducting element having a radial finger adapted to be moved into opposition to said circularly arranged projections, and a non-conducting member engaged with and detachably secured to said conducting element, with its inner face engaged with the outer face of said reduced extension, whereby said knob is rotatively locked upon the cover and upon its pivot against displacement.

2. In a device of the class described, a base member having a depression in one face and sockets in the opposite face, said sockets disposed about a central socket axially aligned with the axis of said depression, conducting elements extending through said base from each socket and projecting into said depression, a cover for said depression having a central opening therein, and a two-part knob comprising a conducting member of larger diameter than said central opening of said cover and pivoted upon said central conducting element, said member having a reduced extension rotatively engaged within the opening of said cover, and having a radial finger adapted to be moved into opposition to said projections, and a non-conducting element of larger diameter than the opening of said cover, having a threaded pin engaged with said conducting element, and having its inner face engaged with the outer face of said reduced extension, whereby said testing knob is rotatively locked against endwise displacement upon its pivot.

In witness whereof, I hereunto subscribe my name, as attested by the two subscribing witnesses.

ALBERT W. THAW.

Witnesses:
R. KISTNER,
GORDON C. AREY.